(12) United States Patent
Chernoff

(10) Patent No.: US 8,142,651 B1
(45) Date of Patent: Mar. 27, 2012

(54) MASS TRANSFER TANK SYSTEM

(76) Inventor: Larry J. Chernoff, Calgary (CA)

( * ) Notice: Subject to any disclaimer, the term of this patent is extended or adjusted under 35 U.S.C. 154(b) by 88 days.

(21) Appl. No.: 12/586,181

(22) Filed: Sep. 18, 2009

(51) Int. Cl.
*B01D 24/16* (2006.01)
*B01D 36/04* (2006.01)
*C02F 1/72* (2006.01)

(52) U.S. Cl. ........ 210/151; 210/285; 210/288; 210/305; 210/311; 210/313; 210/519; 210/533; 261/81; 261/94; 261/DIG. 48; 261/DIG. 72

(58) Field of Classification Search .................. 210/150, 210/151, 220, 285, 288, 299, 305, 306, 311, 210/312, 313, 519, 521, 532.1, 533, 534, 210/535; 261/81, 94, DIG. 48, DIG. 72
See application file for complete search history.

(56) References Cited

U.S. PATENT DOCUMENTS

| | | | | |
|---|---|---|---|---|
| 958,832 A * | 5/1910 | Russell | .......................... | 210/519 |
| 1,619,584 A * | 3/1927 | Nelson | ........................... | 210/311 |
| 1,793,510 A * | 2/1931 | Raymond | ...................... | 210/519 |
| 3,218,048 A * | 11/1965 | Smith, Jr. et al. | ...... | 261/DIG. 72 |
| 3,903,000 A * | 9/1975 | Miura et al. | ................... | 210/521 |
| 4,076,617 A * | 2/1978 | Bybel et al. | ............ | 261/DIG. 42 |
| 4,123,481 A * | 10/1978 | Herold et al. | ................... | 261/81 |
| 4,406,789 A * | 9/1983 | Brignon | ......................... | 210/519 |
| 5,030,255 A * | 7/1991 | Tarpley | ......................... | 210/519 |
| 5,281,332 A * | 1/1994 | Vandervelde et al. | ........ | 210/151 |
| 6,171,483 B1 * | 1/2001 | Eden et al. | ..................... | 210/305 |
| 6,631,890 B1 * | 10/2003 | Lau | ................... | 261/94 |
| 6,709,574 B2 * | 3/2004 | James | .......................... | 210/150 |
| 7,329,350 B2 * | 2/2008 | James | .......................... | 210/150 |
| 7,442,295 B2 * | 10/2008 | Cheng et al. | .................. | 210/151 |
| 2010/0206795 A1 * | 8/2010 | Chernoff | ....................... | 210/232 |
| 2010/0300961 A1 * | 12/2010 | Chernoff | .................... | 210/512.3 |

* cited by examiner

Primary Examiner — Christopher Upton

(57) ABSTRACT

A tank has a side wall bounded by a top and a bottom. An axis extends vertically through the tank. An inlet line for water of a first condition extends through the top with a lower end at a lower extent of the tank. An outlet line for water of a second condition has a lower end within an intermediate extent of the tank. A dispenser at the lower end of the water inlet line has apertured legs extending radially within the tank. An oscillator within the tank above the dispenser is operatively coupled to the inlet line for mixing all of the water of a first condition entering the tank through the inlet line while thereafter forwarding all of the mixed water of a first condition to the dispenser.

5 Claims, 3 Drawing Sheets

MASS TRANSFER TANK SYSTEM

BACKGROUND OF THE INVENTION

Field of the Invention

The present invention relates to a mass transfer tank system and more particularly pertains to continuously converting water of a first condition to water of a second condition by settling out contaminants and by aeration in a sanitary, convenient and economical manner.

SUMMARY OF THE INVENTION

In view of the disadvantages inherent in the known types of transfer systems of known designs and configurations now present in the prior art, the present invention provides an improved mass transfer tank system. As such, the general purpose of the present invention, which will be described subsequently in greater detail, is to provide a new and improved mass transfer tank system and method which has all the advantages of the prior art and none of the disadvantages.

To attain this, the present invention essentially comprises a mass transfer tank system. First provided is a tank. The tank has a cylindrical side wall. The tank has a generally hemispherical top. The tank has a generally hemispherical bottom. The tank has an axis. The axis extends vertically through the tank, including the top and bottom. The tank is fabricated of polyvinyl chloride. The tank is coated exteriorly with fiber glass.

An inlet line for water of a first condition is provided. The inlet line is coaxial with the axis over the majority of its length. The inlet line extends centrally through the top. The inlet line has a lower end. The lower end is provided within a lower extent of the tank. The inlet line has an upper end. The upper end is provided above the tank.

An outlet line for water of a second condition is provided next. The outlet line is provided parallel with and offset from the axis over the majority of its length. The outlet line extends through the top. The outlet line has a lower end. The lower end is provided within an upper extent of the tank. The outlet line has an upper end. The upper end is provided above the tank.

A contaminant discharge line is provided. The discharge line has an input end. The input end is centrally located at the bottom of the tank. The discharge line has an outlet end. The outlet end is provided exterior of the tank. A valve is provided. The valve is provided in the discharge line exterior of the tank. In this manner settled out contaminants may be periodically removed from the tank.

Provided next is a dispenser. The dispenser is provided at the lower end of the water inlet line. The dispenser has apertured legs. The apertured legs extend radially and downwardly within the tank immediately above the bottom. The apertured legs are adapted to spread out water of a first condition throughout the tank. In this manner the settling out of the contaminants and aeration are accelerated. A water impervious shroud is provided. The shroud is fabricated of a flexible plastic. The shroud is positioned immediately above the apertured legs. The legs and shroud are adapted to further accelerate the settling out of the contaminants. The shroud functions as a separation bag to act as a barrier for settled out particles and to slow down the flow of water moving upwardly within the tank. This action keeps settled out particulates from rising in the tank and makes for a cleaner water at the top.

Further provided is an oscillator. The oscillator is provided within the tank above the dispenser and the shroud. The oscillator is operatively coupled to the inlet line. In this manner, the water of the first condition entering the tank through the inlet line is mixed. Thereafter all of the mixed water of a first condition is forwarded to the dispenser. The settling out of contaminants and the aeration is thus accelerated.

Provided last is a plurality of contact balls. The contact balls are provided within the tank. The contact balls fill the majority of the tank. The contact balls encompass the dispenser and the oscillator. Each contact ball is of a generally spherical configuration. Each contact ball has a diameter between 3 inches and 5 inches. Each contact ball is knit of plastic strands. In this manner water is allowed to flow through the contact balls from the oscillator and the dispenser. Also in this manner air entrained on the water will form bubbles of a reduced size entrained on surfaces of the contact balls. Further in this manner aeration of water moving through the tank is maximized.

The flow of water with respect to the system features a flow of water entering through the top of the tank. The water passes through the mechanical oscillator which principally functions to mix the water. Thereafter, all of the mixed water passes to the distributor. The distributor functions to create an equal dispersion of water at the bottom of the tank. The water then travels upwardly while passing through the contact balls. The contact balls function as a trap for contaminant particles and for air particles of a reduced size. The captured air further oxidizes contaminant particles. The most important aspect of the contact balls is the increase of contact time and added surface area between the water and the air particles. Periodic cleaning of the contact balls is necessary.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mass transfer tank system which has all of the advantages of the prior art transfer systems of known designs and configurations and none of the disadvantages.

It is another object of the present invention to provide a new and improved mass transfer tank system which may be easily and efficiently manufactured and marketed.

It is further object of the present invention to provide a new and improved mass transfer tank system which is of durable and reliable constructions.

An even further object of the present invention is to provide a new and improved mass transfer tank system which is susceptible of a low cost of manufacture with regard to both materials and labor, and which accordingly is then susceptible of low prices of sale to the consuming public, thereby making such mass transfer tank system economically available to the buying public.

Even still another object of the present invention is to provide a mass transfer tank system for continuously converting water of a first condition to water of a second condition by settling out contaminants and by aeration in a sanitary, convenient and economical manner.

Lastly, it is an object of the present invention to provide a new and improved mass transfer tank system. A tank has a side wall bounded by a top and a bottom. An axis extends vertically through the tank. An inlet line for water of a first condition extends through the top with a lower end at a lower extent of the tank. An outlet line for water of a second condition has a lower end within an intermediate extent of the tank. A dispenser at the lower end of the water inlet line has apertured legs extending radially within the tank. An oscillator is provided within the tank above the dispenser. The oscillator is operatively coupled to the inlet line for mixing the water of a first condition entering the tank through the inlet line while forwarding all of the water of a first condition to the dispenser.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figures 1, 2:
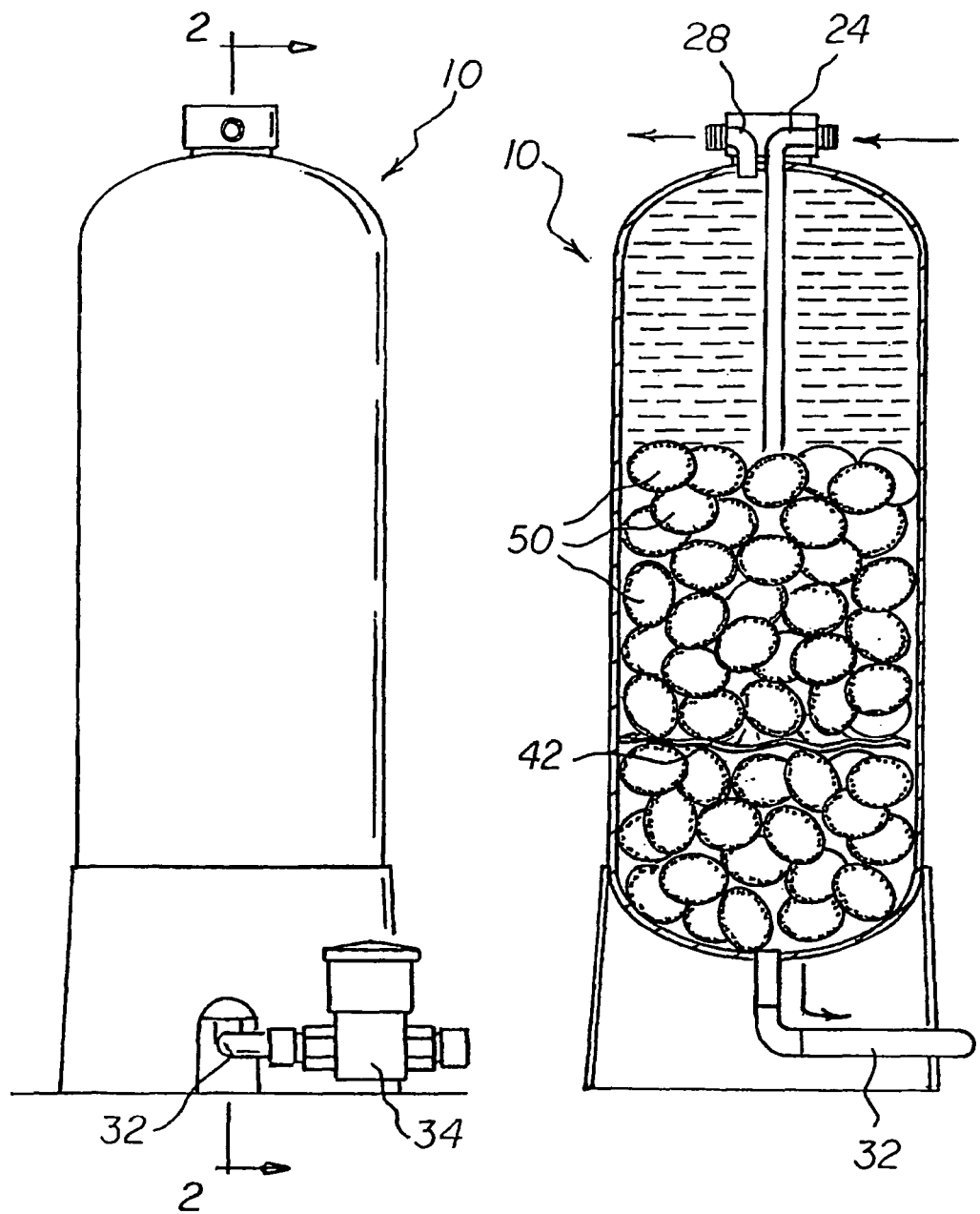
FIG. 1 is a front elevational view of a mass transfer tank system constructed in accordance with the principles of the present invention.
FIG. 2 is a cross sectional view taken along line 2-2 of FIG. 1.
Figures 3, 4:
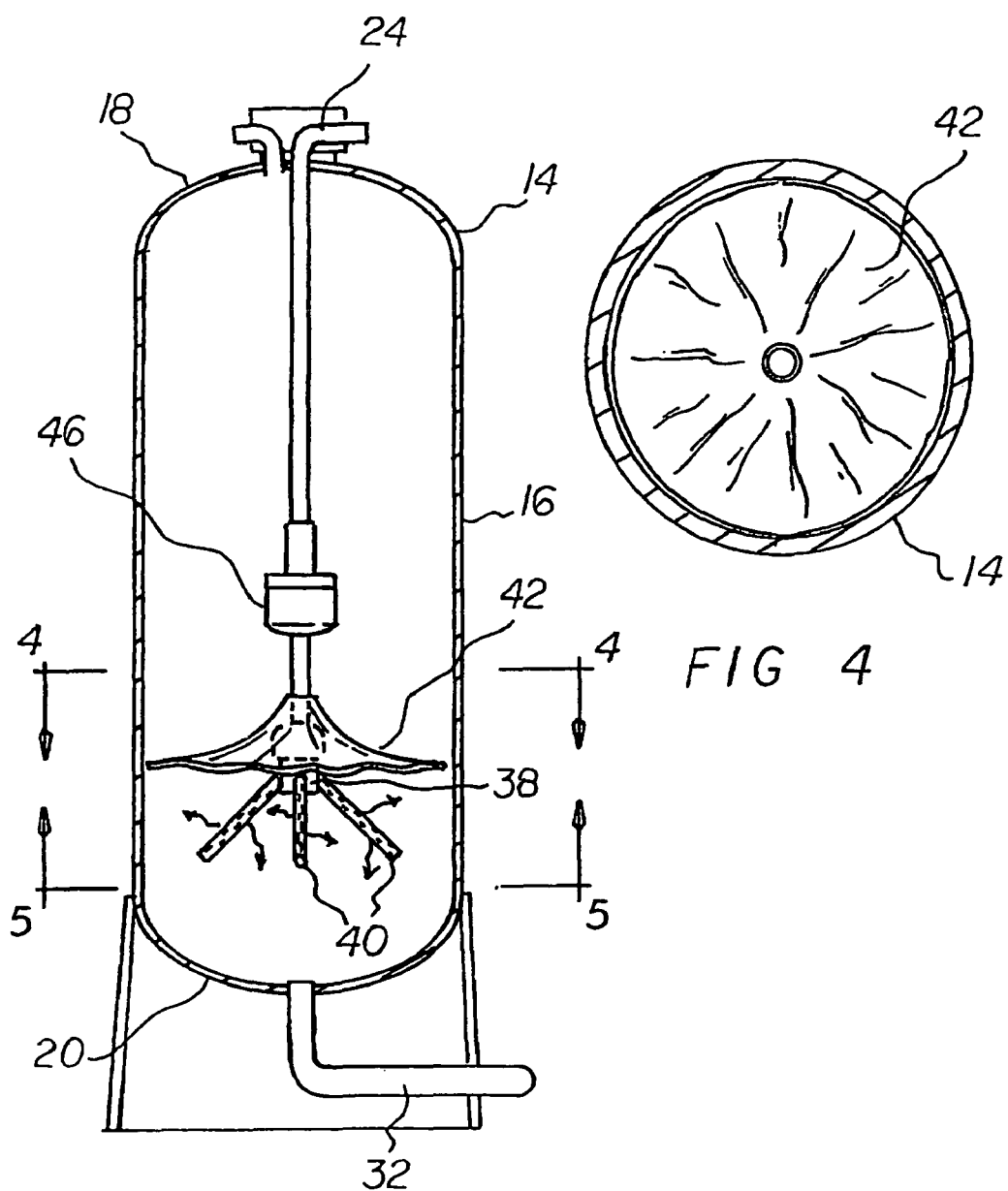
FIG. 3 is a cross sectional view similar to FIG. 2 but with the contact balls removed.
FIG. 4 is a cross sectional view taken along line 4-4 of FIG. 3.
Figure 5:
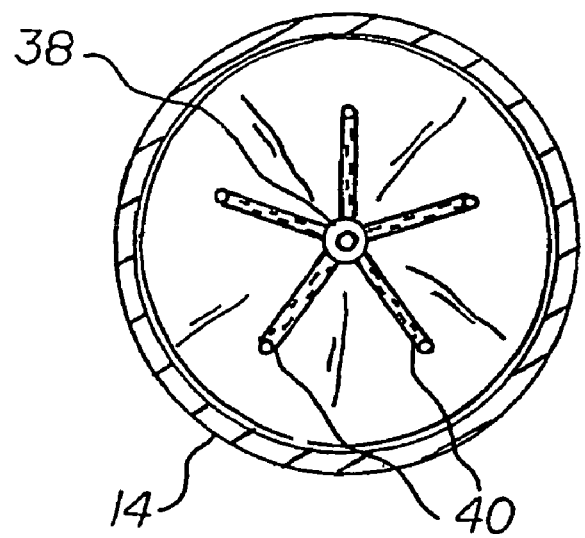
FIG. 5 is a cross sectional view taken along line 5-5 of FIG. 3.
Figure 6:
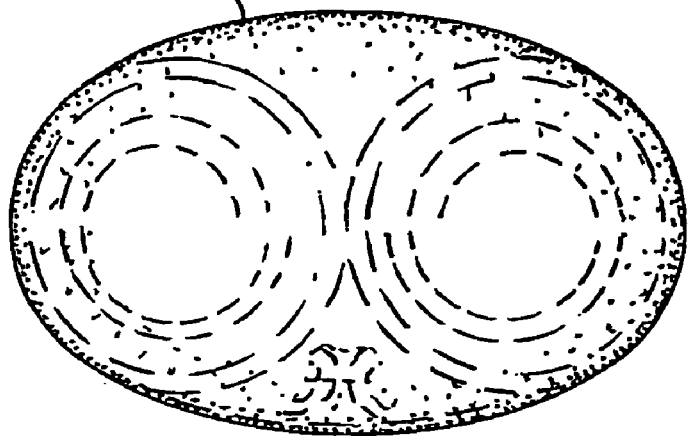
FIG. 6 is a front elevational view of one contact ball shown in FIG. 2.

With reference now to the drawings, and in particular to FIG. 1 thereof, the preferred embodiment of the new and improved mass transfer tank system embodying the principles and concepts of the present invention and generally designated by the reference numeral 10 will be described.

The present invention, the mass transfer tank system 10 is comprised of a plurality of components. Such components in their broadest context include a tank, an inlet line for water of a first condition, an outlet line for water of a second condition, a dispenser and an oscillator. Such components are individually configured and correlated with respect to each other so as to attain the desired objective. The system of the present invention is adapted to convert water of a first condition to water of a second condition. By water of a first condition it is meant raw untreated water or pre-treated water. By water of a second condition it is meant precipitated water or further processed water or cleaner pre-treated water First provided is a tank 14. The tank has a cylindrical side wall 16. The tank has a generally hemispherical top 18. The tank has a generally hemispherical bottom 20. The tank has an axis. The axis extends vertically through the tank, including the top and bottom. The tank is fabricated of polyvinyl chloride. The tank is coated exteriorly with fiber glass.

An inlet line 24 water of a first condition is provided. The inlet line is coaxial with the axis over the majority of its length. The inlet line extends centrally through the top. The inlet line has a lower end. The lower end is provided within a lower extent of the tank. The inlet line has an upper end. The upper end is provided above the tank.

An outlet line 28 for water of a second condition is provided next. The outlet line is provided parallel with and offset from the axis over the majority of its length. The outlet line extends through the top. The outlet line has a lower end. The lower end is provided within an upper extent of the tank. The outlet line has an upper end. The upper end is provided above the tank.

A contaminant discharge line 32 is provided. The discharge line has an input end. The input end is centrally located at the bottom of the tank. The discharge line has an outlet end. The outlet end is provided exterior of the tank. A valve 34 is provided. The valve is provided in the discharge line exterior of the tank. In this manner settled out contaminants may be periodically removed from the tank.

Provided next is a dispenser 38. The dispenser is provided at the lower end of the water inlet line. The dispenser has apertured legs 40. The apertured legs extend radially and downwardly within the tank immediately above the bottom. The apertured legs are adapted to spread out water of a first condition throughout the tank. In this manner the settling out of the contaminants and aeration are accelerated. A water impervious shroud 42 is provided. The shroud is fabricated of a flexible plastic. The shroud is positioned immediately above the apertured legs. The legs and shroud are adapted to further accelerate the settling out of the contaminants. The shroud functions as a separation bag to act as a barrier for settled out particles and to slow down the flow of water moving upwardly within the tank. This action keeps settled out particulates from rising in the tank and makes for a cleaner water at the top.

One type of dispenser adapted for use in the present inventive system is a dispenser of the type disclosed in my co-pending U.S. patent application Ser. No. 12/308,795 filed Dec. 23, 2008, the subject matter of which pending application is incorporated herein by reference. A wide variety of other types of dispensers including plate separation devices are also readily adapted to be utilized within the system of the present invention.

Further provided is an oscillator 46. The oscillator is provided within the tank above the dispenser and the shroud. The oscillator is operatively coupled to the inlet line. In this manner all of the water of a first condition entering the tank through the inlet line is mixed. Thereafter, all of the mixed water of a first condition is forwarded to the dispenser. The settling out of contaminants and the aeration is thus accelerated.

The preferred oscillator is of the type disclosed in my co-pending U.S. patent application Ser. No. 12/455,126 filed May 28, 2009, the subject matter of which application is incorporated herein by reference.

Provided last is a plurality of contact balls 50. The contact balls are provided within the tank. The contact balls fill the majority of the tank. The contact balls encompass the dispenser and the oscillator. Each contact ball is of a generally spherical configuration. Each contact ball has a diameter between 3 inches and 5 inches. Each contact ball is knit of plastic strands. In this manner water is allowed to flow through the contact balls from the oscillator and the dispenser. Also in this manner air entrained on the water will form bubbles of a reduced size entrained on surfaces of the contact balls. Further in this manner aeration of water moving through the tank is maximized.

The flow of water with respect to the system features a flow of water entering through the top of the tank. The water passes through the mechanical oscillator which principally functions to mix the water. Thereafter, all of the mixed water passes to the distributor. The distributor functions to create an equal dispersion of water at the bottom of the tank. The water then travels upwardly while passing through the contact balls. The contact balls function as a trap for contaminant particles and for air particles of a reduced size. The captured air further oxidizes contaminant particles. The most important aspect of the contact balls is the increase of contact time and added surface area between the water and the air particles. Periodic cleaning of the contact balls is necessary.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mass transfer tank system comprising:
   a tank having a side wall bounded by a top and a bottom, a axis extending vertically through the tank;
   an inlet line for water of a first condition extending through the top with a lower end at a lower extent of the tank;
   an outlet line for water of a second condition with a lower end within an intermediate extent of the tank;
   a dispenser at the lower end of the water inlet line with apertured legs extending radially within the tank; and
   an oscillator within the tank above the dispenser, the oscillator being operatively coupled to the inlet line for mixing all of the water of a first condition entering the tank through the inlet line and thereafter forwarding all of the mixed water of a first condition to the dispenser.

2. The system as set forth in claim 1 and further including:
   a water impervious shroud immediately above the apertured legs adapted to accelerate the settling out of contaminants.

3. The system as set forth in claim 1 and further including:
   a plurality of contact balls within the tank, the contact balls filling a majority of the tank and encompassing the dispenser and the oscillator, each contact ball being of a generally spherical configuration with a diameter between 3 inches and 5 inches, each contact ball being knit of plastic strands allowing the flow of water there through from the oscillator and the dispenser whereby air entrained on the water will form bubbles of a reduced size entrained on surfaces of the contact balls to maximize aeration and purification of water moving through the tank.

4. The system as set forth in claim 1 and further including:
   a contaminant discharge line having an input end centrally located at the bottom of the tank and an outlet end exterior of the tank, a valve in the discharge line exterior of the tank for periodically removing settled out contaminants from the tank.

5. A mass transfer tank system for continuously converting water of a first condition to water of a second condition by settling out contaminants and by aeration the system comprising, in combination:
   a tank having a cylindrical side wall bounded by a generally hemispherical top and a generally hemispherical bottom, an axis extending vertically through the tank including the top and bottom, the tank being fabricated of polyvinyl chloride coated exteriorly with fiber glass;
   an inlet line for water of a first condition coaxial with the axis over the majority of its length, the inlet line extending centrally through the top, the inlet line having a lower end within a lower extent of the tank and an upper end above the tank;
   an outlet line for water of a second condition parallel with and offset from the axis over the majority of its length, the outlet line extending through the top, the outlet line having a lower end within an upper extent of the tank and an upper end above the tank;
   a contaminant discharge line having an input end centrally located at the bottom of the tank and an outlet end exterior of the tank, a valve in the discharge line exterior of the tank for periodically removing settled out contaminants from the tank;
   a dispenser at the lower end of the water inlet line with apertured legs extending radially and downwardly within the tank immediately above the bottom, the apertured legs adapted to spread out water of a first condition throughout the tank for accelerating the settling out of the contaminants and for aeration, a water impervious shroud fabricated of a flexible plastic and positioned immediately above the apertured legs, the legs and shroud adapted to further accelerate the settling out of the contaminants;
   an oscillator within the tank above the dispenser and the shroud, the oscillator being operatively coupled to the inlet line for mixing all of the water of a first condition entering the tank through the inlet line and thereafter forwarding all of the mixed water of a first condition to the dispenser, the mixing of the water of a first condition adapted to accelerate the settling out of contaminants and the aeration; and
   a plurality of contact balls within the tank, the contact balls filling the majority of the tank and encompassing the dispenser and the oscillator, each contact ball being of a generally spherical configuration with a diameter between 3 inches and 5 inches, each contact ball being knit of plastic strands allowing the flow of water there through from the oscillator and the dispenser whereby air entrained on the water will form bubbles of a reduced size entrained on surfaces of the contact balls to maximize aeration of water moving through the tank.

* * * * *